United States Patent [19]

Tiesler et al.

[11] Patent Number: 4,957,559

[45] Date of Patent: Sep. 18, 1990

[54] AQUEOUS MEDIUM OF A WATER INSOLUBLE ADDITIVE FOR MINERAL FIBER INSULATING MATERIALS

[75] Inventors: Hartmut Tiesler, Bockenheim; Joseph Schirmeisen, Mutterstadt, both of Fed. Rep. of Germany

[73] Assignee: Isover Saint-Gobain, Courbevoie, France

[21] Appl. No.: 49,534

[22] Filed: May 14, 1987

[30] Foreign Application Priority Data

May 15, 1986 [DE] Fed. Rep. of Germany ....... 3616454

[51] Int. Cl.$^5$ ................................................ C08L 1/08
[52] U.S. Cl. ................................... 106/170; 106/191; 106/197.1; 106/197.2; 106/198; 524/43; 524/44; 524/45; 524/261
[58] Field of Search .................... 106/170, 179, 163.1, 106/169, 191, 197.2, 197.1, 198; 524/35, 42, 43, 44, 45, 46, 261, 265, 266

[56] References Cited

U.S. PATENT DOCUMENTS

| | | | |
|---|---|---|---|
| 3,485,651 | 12/1969 | Ganz | 106/179 |
| 3,793,065 | 12/1987 | Morrison et al. | 106/170 |
| 4,040,856 | 8/1977 | Litzinger | 106/170 |
| 4,217,145 | 8/1980 | Gaddis | 106/170 |

OTHER PUBLICATIONS

*Chemical Abstracts*, (1983), vol. 90, p. 265, Resume No. 109651H; SU-A-1016262 A, T. S. Novikova, et al.
*Chemical Abstracts*, (1983), vol. 99, p. 275, Resume No. 199531W; JP-A-58 95 629, Nippon Vaiqua Industries, Ltd.

*Primary Examiner*—Josephine Barr
*Attorney, Agent, or Firm*—Oblon, Spivak, McClelland, Maier & Neustadt

[57] ABSTRACT

Insulating materials consisting of artifical mineral fibers are impregnated with water insoluble additives, e.g. dust binders and/or water repellant finishing agents in that they are wetted with an emulsion of the water insoluble additive in an aqueous solution of a cellulose ether. Impregnation takes place easily and is effective and resistant.

7 Claims, No Drawings

AQUEOUS MEDIUM OF A WATER INSOLUBLE ADDITIVE FOR MINERAL FIBER INSULATING MATERIALS

BACKGROUND OF THE INVENTION

1. Field of the Invention

The invention relates to an aqueous emulsion of a water insoluble additive for insulating materials which consist of artifical mineral fibers, and a method of producing such aqueous emulsions and their use for impregnating (oiling) the synthetic mineral fibers. The invention further relates to insulating materials consisting of synthetic mineral fibers which are impregnated by using such aqueous emulsions.

2. Discussion of the Background

In order to improve their handling properties, insulating materials which consist of synthetic mineral fibers are impregnated with additives such as, for example, dust binders, water repellants, smoothing and lubricant agents as well as other additives. Furthermore, synthetic plastics in the form of thermohardenable duromers such as, for example, phenolformaldehyde resins, are added in order to impart a certain form stability to the mineral fibers in the bonded material.

In order to achieve an even distribution of these additives throughout the mineral fibers which are further processed in the form of a fiber strip, it is necessary for the additives to be incorporated at a stage in the manufacturing process at which the fibers can still be impregnated as individual fibers, in other words before the felted fiber web is formed. This stage in the manufacturing process is in the immediate vicinity of the disaggregating units where, by reason of the proximity of molten glass, high temperatures, intensive radiated heat and the latent risk of fire are present.

Therefore, the additives have to fulfill a number of conditions, i.e., they must have low inherent volatility; it must be possible to dilute them with water; it must be possible to work them by spraying, and they must not burn when being processed.

In current processes, these conditions are fulfilled by aqueous emulsions or dispersions of the additives which have the necessary stability and which can be diluted to the desired low working concentration by the addition of water. Insulating materials consisting of mineral fibers and impregnated with these additives are, however, only conditionally suitable for practical use.

The production of an aqueous emulsion of mineral oils which can be used as a dust binding agent, silicones which can be used as water repellants and similar water-insoluble substances is possible only by using emulsifiers. Emulsifiers are surface-active substances of good solubility both in the aqueous and also in the non-aqueous phase. With mineral oil emulsions which are described in the insulants industry as "oiling materials", outstanding values of dust bonding are achieved. The effect can be attributed to two causes: 1. The oiling substance consisting of mineral oil acts as a lubricant during the relative movements of compacting fibers. Thus, friction of glass on glass is reduced and this also reduces the risk of cracking and shattering of glass (glass fibers). 2. Despite all these precautionary measures the dust formed remains clinging to intact fibers and cannot be thrown off into the ambient air. This effect is a consequence of the tackiness of viscous mineral oils. Therefore, impregnation with dust binders is an essential condition for the marketability of an insulating material which consists of synthetic mineral fibers.

It has, however, been demonstrated that insulating materials impregnated with dust binders easily absorb water. For example, if an insulating mat impregnated with dust binders is placed on water, it rapidly swells up and sinks. Water such as, for instance, rain water sprayed onto such a mat is absorbed and soaks the mat. This represents a considerable disadvantage because insulating materials consisting of mineral fibers which have become wetted in use, for example by rain, have to be dried out at considerable expense and there is a latent risk of corrosion from insulating materials which are not fully dried. Furthermore, many emulsifiable mineral oils or other water insoluble additives can be washed out by the action of the clinging emulsifier.

Even silicones which can be used as additives for the water repellant finishing of insulating materials consisting of mineral fibers can as a rule only be processed to produce stable aqueous emulsions by the addition of solvents and if they have very high proportions of emulsifier. Therefore, the hydrophobic action of the silicone is often weakened and sometimes even cancelled out entirely by the hydrophilic influence of the emulsifier, so that the addition of silicone becomes pointless. Only with particular technical complications can the emulsifier—once the emulsion has been applied to mineral fibers—be so altered that it loses its emusifying effect.

Therefore, numerous experiments have been made with a view to avoiding or circumventing the aforesaid disadvantages of processing emuslifier-containing emulsions to produce additives for use with mineral fiber-containing insulating materials. During an attempt to reduce the quantity of added emulsifier, however, the emulsion became too unstable so that the target, i.e. a water repellant finish, could not be achieved.

Furthermore, alkali or ammonium soaps of fatty or resinous acids having been used as emulsifiers. Such substances can be used as effective emulsifiers for highly viscous mineral oils even if the quantity used is only 5% of the mineral oil. The emulsifying effect of soaps can be rendered ineffective by chemical precipitation with lime-milk, e.g. by the simultaneous spraying of soap-containing emulsion and lime-milk. Ammonium soaps can also be destroyed by thermal decomposition as the impregnated product passes through a continuous dryer. It is obvious that the additional spraying of lime-milk or the additional procedural step of heating in a continuous dryer represent a disadvantageous technical and economic complication.

Furthermore, a process is known in which the highly viscous mineral oil used as an additive for the insulating materials is so diluted by the addition of an organic solvent that its viscosity becomes similar to that of water. In this form, the mineral oil solution is worked into the synthetic resin solution by means of static mixers and is sprayed jointly with it. The method calls for a high proportion of solvent, of 25 to 40% in relation to the mineral oil used as the dust binder and increases the hydrocarbon emission of the plant to two to three times its original level.

SUMMARY OF THE INVENTION

Accordingly, one object of the present invention is to provide a method of easily and effectively and as far as possible, permanently, impregnating insulating materials which consists of artificial mineral fibers with additives such as dust binders, water repellent finishing agents, and smoothing and lubricating agents.

A further object of the invention is to provide a method of impregnating fiber insulating materials which produces insulating materials which absorb as little water as possible.

These and other objects of the present invention which will become apparent from the following specification have been achieved by the present method of producing an aqueous emulsion of a water insoluble additive for artificial mineral fiber insulating materials, which comprises the steps of (a) preparing an aqueous solution of a cellulose ether, and (b) dispersing the water insoluble additive in the aqueous solution.

These objects are also achieved by the aqueous emulsion produced by this method and by the impregnated mineral fibers so produced.

DETAILED DESCRIPTION OF THE PREFERRED EMBODIMENTS

According to the method of the invention, water insoluble additives such as, for example highly viscous mineral oils, can form emulsions in a viscous solution of water soluble cellulose ethers without the use of an emulsifier or other surfactants, while using heavy duty dispersing units. Finely dispersed stable emulsions are formed in water which are sufficiently resistant for processing under factory conditions. These emulsions can be diluted with conventional agitating means (anchor, blade or bar mixers) to application concentrations with 1% or less active principle content and are miscible with conventional synthetic resin binders and offer appropriate resistance.

Preferred cellulose ethers are alkyl, aralkyl, hydroxyalkyl and carboxyalkyl ethers of cellulose which have no or only weakly marked properties which reduce surface tension. The use of cellulose ethers as emulsifying aids is known, and they act as a protective colloid in order to counteract the coalescence of formed emulsions. They enclose the formed droplets of oil in water without penetrating directly into the inner oil phase like the emulsifiers, i.e. without dissolving in it. By virtue of their insolubility in oil, the cellulose ethers of the outer phase are added to the water in which they are readily soluble and maintain the once-formed emulsion droplets in suspension. However, it was not known that cellulose ethers make it possible to produce aqueous emulsions of additives for insulating materials which consist of artificial mineral fibers and have the effect of permanently coating the additives on the artificial mineral fibers.

Of the cellulose ethers which can be used according to the invention, hydroxyethyl cellulose, methylhydroxyethyl cellulose and sodium-carboxymethyl cellulose are particularly preferred, because they are nonionic and are compatible with phenolic resins. They are preferably used in quantities of 0.1 to 2.5%, particularly 0.2 to 1.0% in relation to the water insoluble additive. Most often used as a water insoluble additive is a dust binder and/or water repellant finishing agent which are known in the field and are quite conventional, the preferred dust binder being a mineral oil while the preferred water repellant finishing agent is a silicone.

Heavy duty dispersing units which may be used in the method according to the invention are those which mechanically achieve a fine dispersion of the water insoluble additive, e.g. the oil or silicone, by applying sufficiently high shearing forces. Such heavy duty dispersion units are, for instance, the units marketed under the trade names Ultra-Turrax ® or Dispax ® by Janke and Kunkel.

Other features of the invention will become apparent in the course of the following descriptions of exemplary embodiments which are given for illustration of the invention and are not intended to be limiting thereof.

EXAMPLES

Example 1

Production of an oil emulsion of a water repellant finishing agent by the batch process The following components were placed in a 120-liter mixing container:

(a) 200 kg of a 0.75% aqueous solution of hydroxyethyl cellulose (HEC) under the designation Tylose H 100,000 ® of Hoechst AG, (b) 300 kg production oil, specifically heated steam cylinder oil ZB DIN 51 510 (a mineral oil), (c) 500 kg completely deionized water.

Heated to 50° C., the HEC solution and the production oil (mineral oil) are intensively blended for 10 to 15 minutes with an Ultra-Turrax ® heavy duty dispersion unit made by Janke and Kunkel which, by applying high shearing forces, achieves a sufficiently fine dispersion of the oil by purely mechanical means, until a mixture results which is entirely homogeneous in color. Afterwards, the completely deionized water at 20 to 25° C. is added to the mixture, accompanied by agitation. The addition is begun slowly and then at an increased rate.

1000 kg of a 30% basic emulsion are obtained which can be further processed to any desired concentration for use.

Example 2

Production of an oil emulsion of a water repellant finishing agent by the continuous method The production components for a 30% basic emulsion are:

(a) 200 kg of a 1% aqueous solution of sodium carboxymethyl cellulose under the designation CBR 10,000-np ® of Hoechst AG, (b) 300 kg mineral oil, Fiona ZB grade, produced by Shell AG, (c) 500 kg completely deionized water.

From two storage containers, the mineral oil heated to 50° C. and the 1% aqueous solution of sodium carboxymethyl cellulose are drawn by means of two piston dispensing pumps and fed to a continuously operating disperser of the Dispax Reactor type (Janke and Kunkel), by three serially connected rotor stator blades in a volume ratio of mineral oil to sodium carboxymethyl cellulose solution of 3:2. Upon a single passage through the plant, the two components are intensively blended with a residence time of approximately 2 sec.

Afterwards, this mixture is conducted into a second Dispax Unit of the same construction where, by the addition of five parts of the fully deionized water, the emulsion is diluted to 30%.

By the addition of further quantities of water in a static mixer, the resultant emulsion can be diluted to the desired usage concentration of 2 to 8%.

It is also possible according to the method of the invention to disperse silicone oils, reactive silicone oils and mixtures of these substances with mineral oil, as the following Examples demonstrate:

Example 3

Production of an oil emulsion of a water repellant finishing agent by the batch method The production components for a 30% basic emulsion are:

(a) 150 kg of a 1% aqueous solution of methyl hydroxyethyl cellulose (CMC), specifically Tylose C 10,000 ® of Hoechst AG, (b) 240 kg production oil (mineral oil) specifically heated steam cylinder oil ZB DIN 51 510 of Shell AG under the designation Shell Production Oil 0303, (c) 60 kg of silicone oil of type "DC 200/100 cSt., fluid" of Dow-Corning, (d) 550 kg fully deionized water.

The procedure is the same as in Example 1, mineral oil and silicone oil being pre-mixed prior to addition of the solution of sodium carboxymethyl cellulose.

Example 4

Production of a mixed water repellant finishing agent in a batch process

The production components for a 30% basic emulsion are:

(a) 200 kg of a 0.75% aqueous solution of hydroxyethyl cellulose, specifically Tylose A 1000 ® of Hoechst AG, (b) 240 kg production oil, specifically super heated steam cylinder oil ZB DIN 51 510 production oil No. 6 of Kompressol, (c) 60 kg silicone oil with reactive Si—H groups, DC 1107 Fluid ® of Dow Corning, (d) 550 kg fully deionized water.

The procedure is the same as in Example 1. The mineral oil is pre-mixed with the silicone oil before the hydroxyethyl cellulose solution is added.

Example 5

Production of a silicone oil emulsion of a water repellant finishing agent by the continuous or batch process The production components for a 30% basic emulsion are:

(a) 300 kg of a 0.75% aqueous solution of hydroxyethyl cellulose, specifically Tylose A 1000 ® of Hoechst AG, (b) 300 kg silicone oil, Tego CK 500 ® of Goldschmitt AG, Essen, (c) 400 kg fully deionized water.

The procedure is the same as in Example 1 or 2.

The basic emulsions produced in accordance with Examples 1 to 5 are processed as follows.

Example 6

Production of a mineral fiber insulating mat with no synthetic resin bonding

With regard to production of glass fibers by a jet process, an approximately 2% oil emulsion produced according to Examples 1 to 5 and in a quantity of 25 liters per 100 kg of glass fibers, is sprayed by a plurality of jets onto the glass fiber stream which is at a temperature of 600° to 700° C. below the fiber producing unit (blower jet) prior to entry into the gravity shaft. After they have passed through the gravity shaft, the fibers which are now cooled to 100° to 120° C. and which carry an oiling agent are collected on a conveyor belt and transported along a 30 to 40 m cooling stage for drying purposes.

The speed of the belt below the gravity shaft is set, so that, mineral fiber mats are produced in a thickness of 30 to 120 mm and with an oil content of 0.2 to 0.4%.

Example 7

Production of mineral fiber insulating panel or mat with a synthetic resin bonding With regard to the manufacture of glass fibers by the centrifugal method, jet process or die drawing process, an aqueous solution containing 1 to 10% by weight of solids and of the following composition is sprayed onto the mineral fibers produced, when they are underneath the fiber producing unit and shortly before they enter what is known as the collecting chamber (gravity shaft):

(Example 7a)

3 (1 to 10) parts by weight of a phenolformaldehyde precondensate(resol resin);

1 (0.5 to 2) parts by weight oil as a 2 (1 to 3) % emulsion, produced by the method according to the invention as in Example 1 or 2 (oil emulsion without silicone).

(Example 7b)

2 (1 to 10) parts by weight of a phenolformaldehyde precondensate (resol resin);

2 (0.5 to 2) parts by weight of oleo oil as a 2 (1 to 3) % emulsion produced by the method of the invention as in Example 3 or 4 (oil emulsion with silicone).

(Example 7c)

2.5 (0.4 to 5) parts by weight of a phenolformaldehyde precondensate (resol resin);

0.4 (0.2 to 0.8) parts by weight of a silicone oil in the form of a (3 to 6) % aqueous emulsion produced by the method according to the invention with 0.75% by weight carboxy methyl cellulose (Example 5) (silicone and emulsion without oil).

(Example 7d)

the same as (Example 7b) but without resol resin.

The moist web of fibers formed underneath the gravity shaft is then compressed between two perforated metal strips to a thickness of 15 to 150 mm, to produce a panel or a felt while at the same time the material is dried with hot air at 200° to 220° C. and hardened. The felt produced in this way is dried on a wire mesh to produce a rollable mat.

Results

The mats and panels produced in accordance with Examples 6 and 7 were subjected to a "submersion test" to ascertain the quantity of water they absorbed. The submersion test comprises the following stages.

Square test specimens measuring 200×200 mm are cut, immersed at least 30mm deep in water for 10 minutes, after which they are taken out, placed on edge for 10 minutes to allow the water to drip off and the increase in weight is ascertained (converted to liters per cubic meter). A product is described as water repellant if it absorbs less water in kg/m$^3$ than its thickness is in mm. Values up to 40 kg/m$^3$ are acceptable regardless of thickness.

The Table represents the quantity of water absorbed (in kg/m$^3$) with various products produced according to the prior art and by the method according to the invention respectively.

TABLE

| | Mat without synthetic resin bonding (density 90–120 kg/m³) | | Mat with synthetic resin bonding (phenol formaldehyde resol) (density 60–85 kg/m³) | | |
|---|---|---|---|---|---|
| Impregnation | Production of the mat | quantity of water absorbed (kg/m³) | Production of the emulsion | Production of the mat | quantity of water absorbed (kg/m³) |
| With emulsifier containing mineral oil lubricant, without silicone, to the state of the art | According to Example 6, with * | 700–850 | * | According to Example 71 but with * | 300–400 |
| With mineral oil emulsion, without silicon, according to the invention | — | — | According to Examples 1 and 2 | According to Example 7a | 50–100 |
| With silicon oil emulsion, without mineral oil, according to the invention | — | — | According to Example 5 | According to Example 7c | 15–30 |
| With mineral oil and silicon emulsion according to the invention | (Emulsion according to Example 4) According to Example 7d | 20–80 | According to Examples 3 and 5 | According to Example 7b | 5–20 |

*Commercial oil emulsion (Praeparol ® of Stockhausen, in Krefeld).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method of producing an aqueous emulsion consisting of water, a cellulose ether and a water insoluble additive used with artificial mineral fiber insulating materials, comprising the steps of:
   (i) preparing an aqueous solution of a cellulose ether, and
   (ii) dispersing a water insoluble additive selected from the group consisting of mineral oil, silicone, and mixtures thereof in said aqueous solution to obtain said emulsion, wherein said cellulose ether is present in an amount between about 0.1–2.5% by weight relative to said water insoluble additive.

2. The method of claim 1, wherein said cellulose ether is selected from the group consisting of hydroxyethyl cellulose, methyl hydroxyethyl cellulose, sodium carboxymethyl cellulose and mixtures thereof.

3. The method of claim 1, wherein said cellulose ether is present in an amount between about 0.2–1% relative to said water insoluble additive.

4. The method of claim 1, wherein said dispersing step is performed by means of a heavy duty dispersion unit.

5. The emulsion of claim 4, wherein said cellulose ether is selected from the group consisting of hydroxyethyl cellulose, methyl hydroxyethyl cellulose, sodim carboxymethyl cellulose and mixtures thereof.

6. The emulsion of claim 4, wherein said cellulose ether is present in an amount between 0.2–1% by weight relative to said water insoluble additive.

7. An aqueous emulsion of a water insoluble additive used with artificial mineral fiber insulating materials, consisting of a dispersion of a water insoluble additive selected from the group consisting of mineral oil, silicone, and mixtures thereof in an aqueous solution of a cellulose ether, wherein said cellulose ether is present in an amount between about 0.1–2.5% by weight relative to said water soluble additive.

* * * * *